(12) United States Patent
Toens et al.

(10) Patent No.: US 9,195,438 B2
(45) Date of Patent: Nov. 24, 2015

(54) SYSTEM, METHOD AND COMPUTER PROGRAM PRODUCT FOR CREATING AN APPLICATION WITHIN A SYSTEM

(71) Applicant: salesforce.com, inc., San Francisco, CA (US)

(72) Inventors: Simon Toens, San Francisco, CA (US); Eugene Li, Saratoga, CA (US); Sheng Wang, Cupertino, CA (US); Adam Torman, Oakland, CA (US); Andrew Smith, Austin, TX (US); Herman Kwong, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/050,299

(22) Filed: Oct. 9, 2013

(65) Prior Publication Data

US 2014/0173553 A1 Jun. 19, 2014

Related U.S. Application Data

(60) Provisional application No. 61/739,104, filed on Dec. 19, 2012.

(51) Int. Cl.
*G06F 9/44* (2006.01)
*G06F 9/445* (2006.01)

(52) U.S. Cl.
CPC .............. *G06F 8/30* (2013.01); *G06F 9/44584* (2013.01)

(58) Field of Classification Search
CPC .................. G06F 9/44584; G06F 8/30–8/316; G06F 8/447; G06F 8/60–8/64; G06F 8/20–8/24; G06F 8/76

USPC .................................................. 717/100–178
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,061,516 A * | 5/2000 | Yoshikawa et al. | 717/109 |
| 6,092,083 A | 7/2000 | Brodersen et al. | |

(Continued)

OTHER PUBLICATIONS

System Center 2012 Configuration Manager Unleashed—Kerrie Meyler,Byron Holt,Marcus Oh,Jason Sandys,Greg Ramsey,with Niall Brady,Samuel Erskine,Torsten Meringer,Stefan Schörling,Kenneth van Surksum,Steve Thompson—2012.*

(Continued)

*Primary Examiner* — Jason Mitchell
*Assistant Examiner* — Francisco Aponte
(74) *Attorney, Agent, or Firm* — Zilka-Kotab, PC

(57) ABSTRACT

In accordance with embodiments, there are provided mechanisms and methods for creating an application within a system. These mechanisms and methods for creating an application within a system can enable improved application diversity and productivity, enhanced customer experience, increased user flexibility, etc.

14 Claims, 4 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,073,172 B2 * | 7/2006 | Chamberlain ............... 717/169 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,783,608 B2 * | 8/2010 | Shitomi ....................... 707/667 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,140,576 B1 * | 3/2012 | Viripaeff et al. ............. 707/781 |
| 8,275,836 B2 | 9/2012 | Beaven et al. |
| 8,447,779 B2 * | 5/2013 | Viripaeff et al. ............. 707/781 |
| 8,457,545 B2 | 6/2013 | Chan |
| 8,484,111 B2 | 7/2013 | Frankland et al. |
| 8,676,617 B2 * | 3/2014 | Berger et al. ................ 705/7.11 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0194314 A1 * | 12/2002 | Kouznetsov et al. ......... 709/220 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005262 A1 * | 1/2005 | Mohan et al. ................ 717/109 |
| 2005/0050555 A1 | 3/2005 | Exley et al. |
| 2005/0091098 A1 | 4/2005 | Brodersen et al. |
| 2005/0091192 A1 * | 4/2005 | Probert et al. .................... 707/1 |
| 2005/0198618 A1 * | 9/2005 | Lalonde et al. ............... 717/110 |
| 2005/0223022 A1 | 10/2005 | Weissman et al. |
| 2006/0021019 A1 | 1/2006 | Hinton et al. |
| 2006/0059458 A1 * | 3/2006 | Plummer ....................... 717/108 |
| 2007/0094281 A1 * | 4/2007 | Malloy et al. ................ 707/100 |
| 2008/0127136 A1 * | 5/2008 | Hino et al. ................... 717/140 |
| 2008/0147675 A1 * | 6/2008 | Engehausen et al. ........... 707/10 |
| 2008/0201701 A1 * | 8/2008 | Hofhansl et al. ............. 717/168 |
| 2008/0249972 A1 | 10/2008 | Dillon |
| 2008/0263511 A1 * | 10/2008 | Shapiro ........................ 717/104 |
| 2008/0270977 A1 * | 10/2008 | Nucci et al. .................. 717/105 |
| 2008/0275939 A1 * | 11/2008 | Martin .......................... 709/203 |
| 2009/0049101 A1 * | 2/2009 | Weissman ................... 707/104.1 |
| 2009/0063415 A1 | 3/2009 | Chatfield et al. |
| 2009/0100342 A1 | 4/2009 | Jakobson |
| 2009/0124374 A1 * | 5/2009 | Patel ............................... 463/29 |
| 2009/0124375 A1 * | 5/2009 | Patel ............................... 463/29 |
| 2009/0177744 A1 | 7/2009 | Marlow et al. |
| 2010/0251231 A1 * | 9/2010 | Coussemaeker et al. ...... 717/176 |
| 2011/0225217 A1 * | 9/2011 | Plax et al. ..................... 707/825 |
| 2011/0231831 A1 * | 9/2011 | Smith et al. .................. 717/170 |
| 2011/0231835 A1 * | 9/2011 | Smith et al. .................. 717/174 |
| 2011/0238707 A1 * | 9/2011 | Wong et al. ................... 707/802 |
| 2011/0258233 A1 * | 10/2011 | Unger et al. .................. 707/783 |
| 2012/0036494 A1 * | 2/2012 | Gurumohan et al. ......... 717/106 |
| 2012/0066755 A1 * | 3/2012 | Peddada et al. ................... 726/8 |
| 2012/0102402 A1 * | 4/2012 | Kwong ......................... 715/705 |

(56) References Cited

U.S. PATENT DOCUMENTS

| | | | |
|---|---|---|---|
| 2012/0143916 A1* | 6/2012 | Viripaeff et al. | 707/783 |
| 2012/0151444 A1* | 6/2012 | Weissman | 717/122 |
| 2012/0297378 A1* | 11/2012 | Shapiro | 717/177 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |

OTHER PUBLICATIONS

Oracle® Fusion Middleware Concepts and Technologies Guide for Oracle Application Integration Architecture Foundation Pack—Rosemarie Hall, Ravi Sankaran, Thiru Annadi—Jan. 2011.*

U.S. Appl. No. 60/828,192, filed Oct. 4, 2006.

* cited by examiner

SYSTEM, METHOD AND COMPUTER PROGRAM PRODUCT FOR CREATING AN APPLICATION WITHIN A SYSTEM

CLAIM OF PRIORITY

This application claims the benefit of U.S. Provisional Patent Application No. 61/739,104, entitled "STANDALONE APPS," by Toens et al., filed Dec. 19, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to application development, and more particularly to creating an application within a system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many current systems utilize applications within the system to perform one or more actions. Unfortunately, techniques for creating such applications have been associated with various limitations. Just by way of example, many current application development techniques may allow access to secure system data and may therefore be restricted only to providers of system resources. Accordingly, it is desirable to provide techniques for conditionally performing garbage collection.

BRIEF SUMMARY

In accordance with embodiments, there are provided mechanisms and methods for creating an application within a system. These mechanisms and methods for creating an application within a system can enable improved application diversity and productivity, enhanced customer experience, increased user flexibility, etc.

In an embodiment and by way of example, a method for creating an application within a system is provided. In one embodiment, a request to create an application is received at a system. Additionally, the application is created within the system, based on the request. Further, access to the created application is regulated within the system.

While one or more implementations and techniques are described with reference to an embodiment in which creating an application within a system is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for creating an application within a system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for creating an application within a system will be described with reference to example embodiments.

Figure 1:
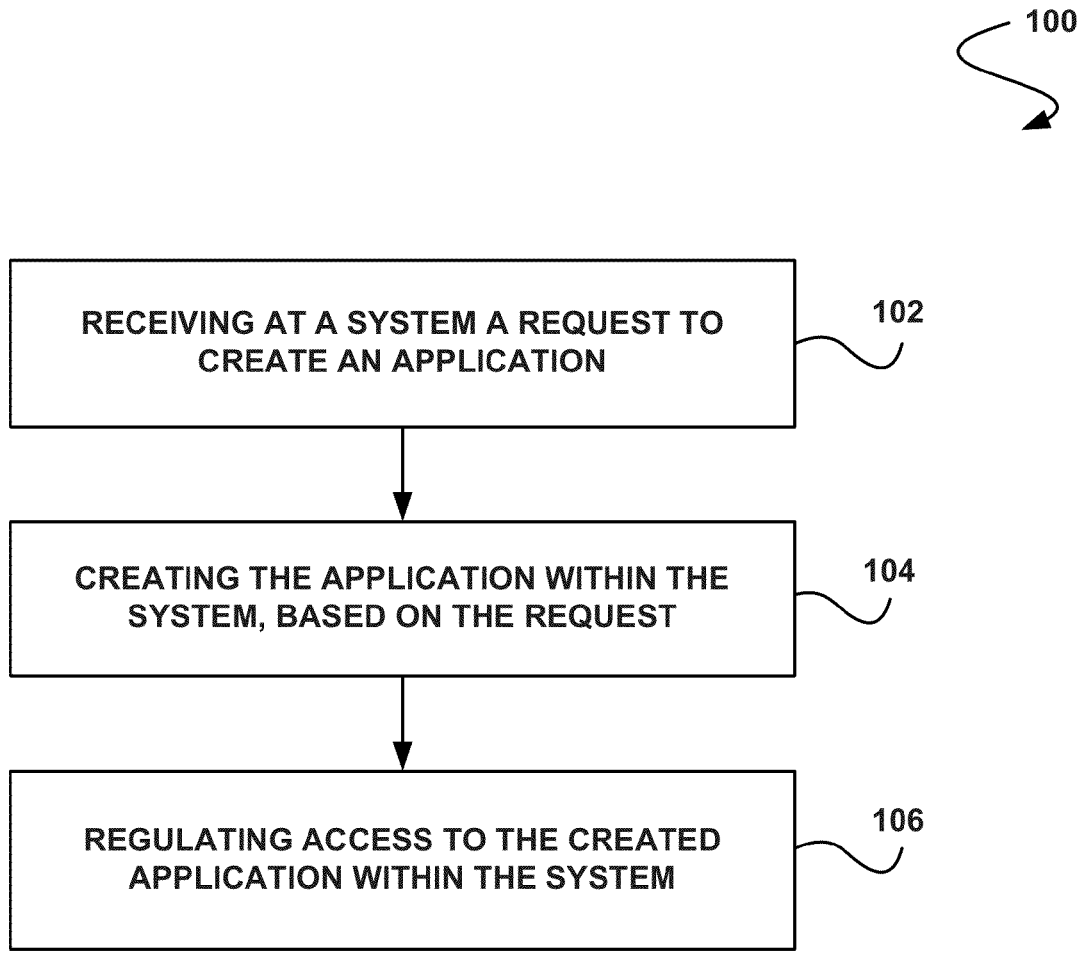
FIG. 1 illustrates a method for creating an application within a system, in accordance with one embodiment.

FIG. 1 illustrates a method 100 for creating an application within a system, in accordance with one embodiment. As shown in operation 102, a request to create an application is received at a system. In one embodiment, the system may include a multi-tenant system. For example, the system may include a multi-tenant on-demand database system. In another embodiment, the request may be received from an entity of the system. For example, the request may be received from a user associated with an organization registered within the system, where the organization is associated with a tenant of the system.

Additionally, in one embodiment, the request may include data associated with the application. For example, the request may include code used for creating the application. In another example, the request may include metadata describing one or more aspects associated with the application. In another embodiment, the request may be created utilizing an interface of the system. For example, the request may be created by an entity utilizing a graphical user interface (GUI) provided by the system.

Further, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, the application is created within the system, based on the request. In one embodiment, the application may include a standalone application. For example, the application may be isolated from one or more other elements of the system. For instance, the application may be created within (and associated with) an organization of the system and may be isolated from all other applications and/or organizations within the system, such that the data accessed by the application may not be accessed by any other applications and/or organizations within the system (or such access by other applications may be regulated). In another embodiment, the application may be associated with an identifier. For example, the application may include a manifest that includes one or more details of the application, including an identifier of the application.

Also, in one embodiment, the isolation of the application may be enabled by providing a namespace for the application. For example, the application may include a module that dictates a namespace for the application, where such namespace is provided and stored within the module. In another embodiment, the module may include a container containing metadata, where such metadata is named, organized, and called utilizing the namespace for the application. For example, the metadata may include configuration information that dictates how the application may be used. In another example, the metadata may include one or more schemas or programmatic elements (e.g., pages, classes, etc.) associated with the application.

In addition, in one embodiment, the namespace may include an identifier associated with the module that limits a scope of calls made using the namespace to only the module associated with the namespace. For example, the namespace may allow objects and/or components associated with the namespace to only be called by an application that includes a module containing that namespace. In this way, the naming constraints provided utilizing the namespace may provide uniqueness and may avoid conflicts between multiple applications. Additionally, an application may have an object that shares a name with a different object of a different application, and such object may be distinguished from the different object through the use of the namespace of the application.

Furthermore, as shown in operation 106, access to the created application is regulated within the system. In one embodiment, access may be regulated to the created application utilizing one or more permission sets. For example, the application may include a permission set containing one or more rules for regulating access associated with the created application. In another embodiment, providing access to the created application may include providing access to one or more components within the application. For example, the one or more permission sets may provide one or more levels of access, where the access is associated with one or more components within the module of the application.

Further still, in one embodiment, the access to the one or more components of the application may be provided to one or more other components contained within one or more other applications (e.g., applications within the same organization, applications within other organizations, applications having a different namespace, etc.). In another embodiment, the access may include a plurality of access levels. For example, the access may include a global access level, a public access level, a private access level, a standalone access level, etc.

In this way, access to the created application, as well as resource sharing associated with the application, may be regulated within the system. Additionally, access and permissions may be easily managed by a tenant of the system.

Figure 2:
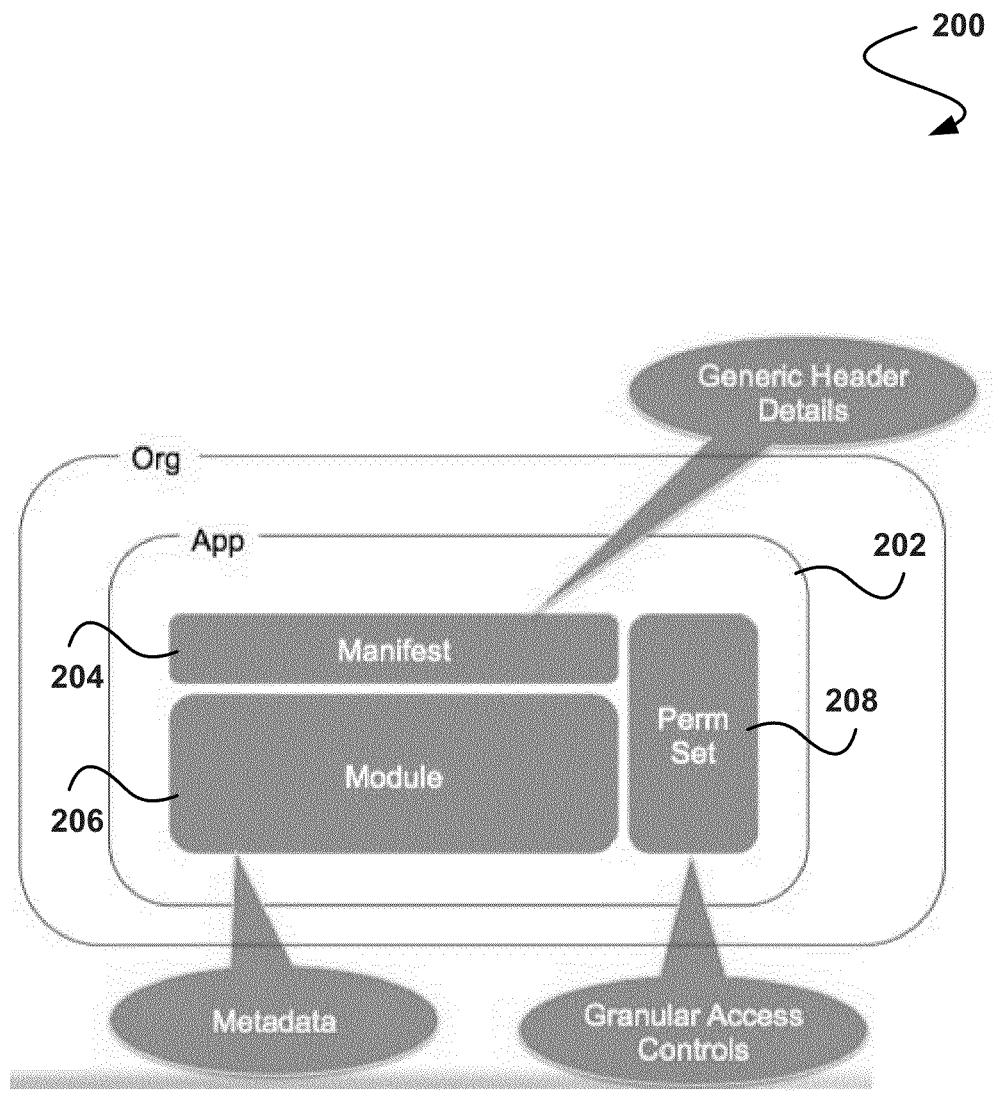
FIG. 2 illustrates an exemplary system organization, in accordance with another embodiment.

FIG. 2 illustrates an exemplary system organization 200, in accordance with another embodiment. As an option, the system organization 200 may be carried out in the context of the functionality of FIG. 1. Of course, however, the system organization 200 may be carried out in any desired environment. The aforementioned definitions may apply during the present description.

As shown, the exemplary system organization 200 includes an application 202. In one embodiment, the system organization 200 may be associated with a single tenant of the system. For example, the system organization 200 may be created and registered by a single tenant of the system. In another embodiment, the application 202 may be developed by the tenant associated with the system. For example, the single tenant associated with the organization 200 may create the application 202 by providing code, metadata, and other components of the application 202 to the system. In yet another embodiment, the application 202 may be developed utilizing an interface (e.g., a GUI, etc.) provided by the system (e.g., when the tenant is logged into the organization of the system, etc.).

Additionally, in one embodiment, the application 202 may include an administrative unit. In another embodiment, the application 202 may have an entry point (e.g., a point of entry into the application 202 that may be selected from an application picker, etc.).

Further, the application 202 includes a manifest 204. In one embodiment, the manifest 204 may include one or more header details associated with the application 202. Further, the application includes a module 206. In one embodiment, the module 206 may include a single standalone module. For example, the module 206 may be both private (e.g., it cannot be referenced from components in other namespaces, etc.) and self-contained (e.g., it cannot reference any component outside of its own namespace, etc.).

In another embodiment, the module 206 may include metadata and other objects associated with the application 202. In yet another embodiment, the module 206 may dictate a namespace associated with the application 202. For example, the module may contain metadata having a unique namespace associated with the application 202. In this way, the module 206 may allow a developer of the application 202 to ensure uniqueness and ownership of all components of the application 202 within the organization 200 of the system.

In another example, the module 206 may include a metadata container with a namespace. This may provide internal only references to metadata and may prevent an access of global resources outside of the namespace of the module 206.

Table 1 illustrates an exemplary overview of namespace usage. Of course, it should be noted that the usage shown in Table 1 is set forth for illustrative purposes only, and thus should not be construed as limiting in any manner.

TABLE 1

Component name: "developerName (___c)"
Global namespace: "globalNs"
Module namespace: "moduleNs"
Call within module namespace:
"globalNs___moduleNs___developerName (___c)"

In this way, the utilization of the namespace within the module 206 may provide a generic container for metadata and coding. In another embodiment, each component of the module 206 may only belong to one module. In yet another embodiment, the module 206 may have one or more dependencies. In one embodiment, the containment of metadata including code within the module 206 may be one or more of a design and run-time constraint. For example, at design time, any reference to external resources (e.g., resources outside of the application 202 within the system, etc.) may be blocked. In another example, at run time, use of dynamic tools such as dynamic queries or code may be blocked from discovering metadata that is out of context from the application 202 (e.g., metadata that uses a namespace different from the namespace dictated by the module 206 of the application 202, etc.).

Additionally, in one embodiment, components in the module 206 may not reference components of other modules (e.g., modules of other applications, etc.). In another embodiment, components of other modules may not reference components of the module 206.

Further, the application 202 includes a permission set 208. In one embodiment, the permission set 208 may include one or more access controls associated with the application 202 (e.g., granular access controls for the application 202, etc.). In another embodiment, the permission set 208 may include a module access level. For example, the module access level may dictate how components within the module 206 may be used by components in other namespaces (e.g., components associated with other applications, etc.).

Further still, in one embodiment, the permission set may provide one or more access levels. Table 2 illustrates exemplary access levels. Of course, it should be noted that the access levels shown in Table 2 are set forth for illustrative purposes only, and thus should not be construed as limiting in any manner.

TABLE 2

| global: | the module's components can be referenced from any other namespace. |
| public: | the module's components can only be referenced from within the module's global namespace. |
| private: | the module's components can only be referenced from within the module's own namespace. |
| standalone: | private + the module's components perceive all other namespaces as private (no outbound references). |

Table 3 illustrates exemplary access level results. Of course, it should be noted that the access level results shown in Table 3 are set forth for illustrative purposes only, and thus should not be construed as limiting in any manner.

TABLE 3

| | Components inside the module may reference components outside the module | Components outside the module (in the global namespace) may reference components inside the module | Components inside a private module may reference components inside the module | Components inside the module may reference components in a private module |
|---|---|---|---|---|
| Global | Yes | Yes | Yes | Yes |
| Public | Yes | Yes | No | No |
| Private | Yes | No | No | No |
| Standalone | Mo | No | No | No |

In one embodiment, the access level within the permission set 208 may be tracked as an enumltem on the module 206. For example, if there are circular dependencies between components in different modules, it may be beneficial for those components to be in the same module to begin with. This is one exemplary way of enforcing developers to build their systems in such a way that is loosely coupled. In another embodiment, circular dependencies may not be allowed between modules. In yet another embodiment, a setting may be provided within the application 202 for allowing or prohibiting extensions. For example, a global module may disallow extending, such that any user may reference and/or use objects within the module but may not add fields to such objects.

Additionally, in one embodiment, references at namespaces at save and/or compile time and runtime may be blocked for any component. This may be applied to children of objects (e.g., a custom field in one module may not be able to be added to an object in another private module, etc.).

Further, in one embodiment, the module 206 may include a metadata container within a namespace. In another embodiment, the namespace may be unique within the organization 200. In yet another embodiment, all components within the module 206 may be scoped by the namespace of the module 206. For example, the organization 200 may have two modules, "core.sales" and "core.hr," where each module has a custom object with the name "cust_c," another embodiment, the namespace of the module 206 may be a flat string, and may not be a folder hierarchy later collapsed to a flat string. In yet another embodiment, a component may only belong to a single module 206.

Further still, in one embodiment, the application 202 may reference one or more modules, and may have at least one module 206. In order to allow shared components between applications, the module 206 may be referenced by more than one application. In another embodiment, the application 202 may have one or more of a unique name, application specific UI components (e.g., page layouts, tabset, etc.), permission sets, publisher metadata, etc. For example, permission sets may be defined at the application level and may contain permissions for components in the application 202. In another embodiment, the permission sets may be assigned to users in the organization 200.

Also, in one embodiment, when the application 202 is created within the organization 200 of the system, a default module may be created automatically for the application 202. In another embodiment, users may create more modules within the application 202 to organize their application components. In yet another embodiment, components in different modules may reference each other according to one or more visibility rules. References between components in different modules may introduce dependencies between modules; modules are the most granular entity at which we dependencies are tracked. Dependent modules may be automatically added to applications. Applications may be moved between sandbox and production.

Additionally, in one embodiment, all components that are not part of any specific module may be treated as being in a legacy module. In another embodiment, standard objects may be able to be referenced from modules without establishing a dependency on the legacy module.

Further, in one embodiment, design-time component CRUD access may be controlled at the module level (e.g., sysadmin per module 206) or at a component granularity (e.g., delegate admin, etc.). A new permission may allow a user to create modules. The user may automatically become a sysadmin of the created module and may own all the metadata in the module. The user may make other users in the org sysadmins of the module(s) they own. The sysadmin of modules may also be the developer of the components in the module—"module sysadmin" and "developer" may be used interchangeably.

Further still, in one embodiment, a sysadmin of a module 206 may make another user a delegate admin of one or more component(s) in the module 206. For example, the sysadmin of the module 206 may give CRUD access to specific metadata in the module 206 to a user in the organization 200 who is not a sysadmin of the module 206. In another embodiment, complex rules may be implemented that specify when a user can be a delegate admin (e.g., only on weekdays during East Coast Business Hours, etc).

Also, in one embodiment, users may be given profiles at the application 202 level. This profile may list all components that are part of the application 202, and a sysadmin may then grant users specific rights to specific components. With profiles at the app level, it may be possible for a user to have different permissions on the same component. For example, App1 and App2 may both use a core module, in which custom object Foo_c lives. The user may be given a profile for each app, in which his App1 profile dictates read only access on Foo_c, whereas his App2 profile gives him full CRUD. In this scenario, the different permissions may be unioned, such that the user may have CRUD access on Foo_c regardless of which application they are in. Another possibility is to introduce the notion of app context in the API.

In addition, in one embodiment, in addition to an application profile, a user may also be given a platform license. These platform licenses may not be transferable between applications.

Furthermore, in one embodiment, a new column (e.g., "module_namespace VARCHAR2(120)," etc.) may be added to all setup entities that can be added to a module 206. Additionally, relevant indices may be updated as well. Table 4 illustrates an updated "core.custom_field_definition" index. Of course, it should be noted that the updated index shown in Table 4 is set forth for illustrative purposes only, and thus should not be construed as limiting in any manner.

TABLE 4

EXEC upgdata.uUpgradeUtils.add_column(upgdata.string_array('Eugene Li'), 'core', 'custom_field_definition', 'module_namespace', 'VARCHAR2(120)');
DROP INDEX core.akcustom_field_definition;
EXEC upgdata.uUpgradeUtils.create_partitioned_index(upgdata.string_array(' Eugene Li'), 'akcustom_field_definition', 'core', 'custom_field_definition', 'organization_id, table_enum_or_id, UPPER(DEVELOPER_NAME), namespace_prefix, CASE WHEN DELETED="P"
THEN
0 ELSE 1 END, app_namespace', 5);

Further still, in one embodiment, one or more new entities may be added to the system. For example, one or more of an application entity, a module entity, a modulemember entity, and an application module entity may be added to the system.

Also, in one embodiment, a module 206 namespace may add a new name between a global namespace and a component developer name. For example, the fully qualified name of a component in a module may be "globalNs_moduleNs_developerName." In another embodiment, the separator between namespace and component may change in some places depending on a type of the component being referenced. For example, the fully qualified name of a component in a module may be "globalNs.moduleNs.apextype."

Additionally, in one embodiment, a component in a module may not have to (but may) fully qualify references to other components that live in the same module. References to components across module boundaries may have to be fully qualified. Legacy components that live at the org/global ns level may be considered to be part of the special "legacy module". This "null" module may not have a name.

Table 5 illustrates three exemplary references. Of course, it should be noted that the references shown in Table 5 are set forth for illustrative purposes only, and thus should not be construed as limiting in any manner,

TABLE 5

Example 1:
Imagine a namespaced org with namespace orgns, with the following components:
- The standard object Account
- A legacy custom object called co1_c
- An installed package with namespace ff and a custom object co1_c
References from some component in the legacy module (== org, so same as what we have today):
        Account    // std object
        co1_c    // legacy co
        orgns_co1_c  // legacy co  (optionally fully qualified)
        ff_co1_c    // packaged co in legacy module (has to be fq)
Example 2:
Same components as above, with a module called ff, and co1_c, a custom object in ff.
Reference from the org's legacy module to co1_c in the org's ff module:
        orgns_ff_co1_c
From a component in the org's ff module:
        co1_c    // co in ff
        orgns_ff_co1_c  // co in ff  (optionally fully qualified)
        orgns_co1_c    // legacy co (has to be fully qualified)

TABLE 5-continued

```
        ff_co1_c            // packaged co in legacy module (has to be fq)
        Account             // std object
Example 3:
Same components as above +
    •       a module called core, and co1_c, a custom object in core
    •       an installed package with global ns bmc and a module called and co1_c and a
            module called core.
References from a component in the org's ff module:
        orgns_core_co1_c {          // co in the org's core module {
        bmc_core_co1_c              // co in the installed core module
From a component in the org's core module:
        co1_c                       // co in core
        orgns_core_co1_c            // (optionally fully qualified)
        orgns_ff_co1_c              // co in ff
        orgns_co1_c                 // legacy co
        ff_co1_c                    // packaged co in legacy module
        bmc_core_co1_c              // package co in the core module
        Account                     // std object
If the org doesn't have a namespace (orgns in above examples), we need some other
reserved identifier to use fully qualified names to mean the "root" of the component
hierarchy.
For example:
        orgns_ff_co1_c              // co in ff, equivalent to
        local_ff_co1_c              // better name?
Alternatively we can force an org to be namespaced before it can create modules.
```

Additionally, in one embodiment, "describeGlobal( )" for new API clients may return not only legacy components but also components in modules, using fully qualified names. Old API clients may not see components in modules. In another embodiment, the default namespace may work with a new namespace syntax.

Further, in one embodiment, urls may contain the global namespace in the host part of the url for security reasons. However sites resolve requests for a page that has the same name as an installed page by using the API name of the page in the org. Table 6 illustrates exemplary URL implementations. Of course, it should be noted that the URL implementations shown in Table 6 are set forth for illustrative purposes only, and thus should not be construed as limiting in any manner.

Further still, in one embodiment, most components may be "published" in the Java interface sense. For example, if col_c is created with field fl_c, any user in your org (e.g., organization, etc.) can reference this custom object, regardless of your intentions. If you want to delete fl_c and it is being referenced, a user may need to find the reference and convince whoever added it to get rid of it. This gets harder if the object is part of an uploaded managed package—the custom object may be locked down and a user may never modify/delete it because somebody on the service may be using it. In this way, everything may be "published" and accessible. At the same time, it makes it impossible to separate implementation details from a published interface.

Also, in one embodiment, two types of hard dependencies on components may be distinguished. For example, a refer-

TABLE 6

```
Example:
Assuming the following org setup:
Vf page foo in module ModA
Vf page foo in installed package ff
Vf page foo legacy
Vf page foo in installed module ModA, global ns: ff
In the app:
http://c.na1.visual.force.com/apex/foo = legacy foo
http://ff.na1.visual.force.com/apex/foo = installed foo in package ff
http://c.na1.visual.force.com/apex/ModA_foo = foo in module ModA
http://ff.na1.visual.force.com/apex/ModA_foo = foo in installed module ModA from
package ff
For sites, your domain could be simon.force.com
http://simon.force.com/foo = legacy page foo
http://simon.force.com/ff_foo = installed page foo from package ff
http://simon.force.com/orgNS_ModA_foo = page foo in Module ModA in local org
http://simon.force.com/ff_ModA_foo = page foo in Module ModA from installed package ff
"Note - we're assuming that org has a global namespace registered. If they don't, we
could use "local", but we're now leaning towards forcing org to register a namespace
when creating a module.
My-domain:
http://mydomain-c.na1.visual.force.com/foo = legacy foo
http://mydomain-ff.na1.visual.force.com/foo = installed foo in package ff
http://mydomain-c.na1.visual.force.com/ModA_foo = foo in module ModA
http://mydomain-ff.na1.visual.force.com/ModA_foo = foo in installed module ModA from
package ff
My-domain on sandbox - same as above. The domain part includes the sandbox name, but
isn't affected by modules in a different way from above.
``` ence to a component may be established when the component is used (e.g., referenced, etc.) in code-like places (e.g., apex/vf/formula fields, etc.). Changing the component may break the reference. A customization of a component may happen when a child component is added to a parent component in a different namespace (e.g., adding a custom field to an installed custom object or to a standard object, etc.).

Additionally, in one embodiment, references may have a static impact. It may be identified at compile time (statically) if a reference is broken. Customizations may be more subtle because they may alter runtime behavior of the parent object. For example, a validation rule or a trigger added to a custom object may now exist globally on the custom object and may always run when the custom object is manipulated.

Further, in one embodiment, access control may be added to components in a module. A new module may start in the most restrictive state. All components in the module may be accessible to each other, hut the components may not be visible from components in other namespaces. In another embodiment, a module may designate other modules as friends—now these modules may access all components in the module. Optionally, a module may have a rule to designate all modules under the same global namespace as friends. In yet another embodiment, friendship at the global namespace level may be allowed to facilitate integrations between ISVs. In still another embodiment, any components of the system may see the components in a public module.

Further still, in one embodiment, if a component is visible, it may be referenced and/or customized. In another embodiment, a distinction may be made between referenceable and customizable. In yet another embodiment, a module with private access that doesn't reference components outside of itself may be guaranteed to be self contained no other modules can depend on it. Any higher access level may allow dependencies between modules to be introduced. Although these dependencies may be ultimately between components, dependencies may be tracked only at the module level. If module B references a custom object from module A, B may now depend on A. An application that uses B also has A. When B is moved to sandbox, A has to come along.

Also, in one embodiment, the system.core namespace may encapsulate the concept of namespace in the code base of the system. That class may have a string, the global namespace. Another string may be added to this class, the module namespace (and adjusting equals/hashCode etc). Namespace may now be constructed from two strings instead of one, and as components are moved into the new module world, they will instantiate the namespace with two strings, typically loaded from plsql. A new method, getFullyQualifiedName, may return the "global_module" syntax, with a default value for global if it is null. The default value may be required to be able to distinguish a custom object in the ff global namespace from a custom object in the ff module.

Most clients of Namespace.getName may be switched to call Namespace.getFullyQualifiedName. getName may be renamed to getGlobalPart. In another embodiment, unpackaged, unmanaged packages, and Managed packages may be retrieved via the Metadata API. Table 7 illustrates exemplary sample outputs. Of course, it should be noted that the sample outputs shown in Table 7 are set forth for illustrative purposes only, and thus should not be construed as limiting in any manner.

TABLE 7

```
In an org with a custom object called legacyObject_c:
    /retrieveUnpackaged
        /objects
            legacyObject_c.object
        package.xml
where legacyObject_c.object's contents are:
    <?xml version="1.0" encoding="UTF-8"?>
    <CustomObject xmlns="http://soap.sforce.com/2006/04/metadata">
        <actionOverrides>
            <actionName>Accept</actionName>
            <type>Default</type>
        </actionOverrides>
        <actionOverrides>
            <actionName>Clone</actionName>
            <type>Default</type>
        </actionOverrides>
        <actionOverrides>
            <actionName>Delete</actionName>
            <type>Default</type>
        </actionOverrides>
        <actionOverrides>
            <actionName>Edit</actionName>
            <type>Default</type>
        </actionOverrides>
        <actionOverrides>
            <actionName>List</actionName>
            <type>Default</type>
        </actionOverrides>
        <actionOverrides>
            <actionName>New</actionName>
            <type>Default</type>
        </actionOverrides>
        <actionOverrides>
            <actionName>Tab</actionName>
            <type>Default</type>
        </actionOverrides>
        <actionOverrides>
            <actionName>View</actionName>
            <type>Default</type>
        </actionOverrides>
```

TABLE 7-continued

```
            <deploymentStatus>Deployed</deploymentStatus>
            <enableActivities>false</enableActivities>
            <enableFeeds>false</enableFeeds>
            <enableHistory>false</enableHistory>
            <enableReports>false</enableReports>
            <label>legacyObject</label>
            <nameField>
            <label>legacyObject Name</label>
            <type>Text</type>
            </nameField>
            <pluralLabel>legacyObjects</pluralLabel>
            <searchLayouts/>
            <sharingModel>ReadWrite</sharingModel>
        </CustomObject>
and package.xml's contents are:
        <?xml version="1.0" encoding="UTF-8"?>
        <Package xmlns="http://soap.sforce.com/2006/04/metadata">
            <types>
            <members>*</members>
            <name>CustomObject</name>
            </types>
            <version>23.0</version>
        </Package>
With a managed package containing legacyObject_c, we see the same
legacyObject_c.object. file, a new legacyObject_c Layout.layout file, and a different
package.xml. This package.xml shows:
        <?xml version="1.0" encoding="UTF-8"?>
        <Package xmlns="http://soap.sforce.com/2006/04/metadata">
            <fullName>managedPackage</fullName>
            <apiAccessLevel>Unrestricted</apiAccessLevel>
            <namespacePrefix>appcde3</namespacePrefix>
            <types>
                <members>legacyObject_c</members>
                <name>CustomObject</name>
            </types>
            <types>
                <members>legacyObject_c-legacyObject Layout</members>
                <name>Layout</name>
            </types>
            <version>23.0</version>
        </Package>
```

Note that the only place where namespace is shown is in the resulting package.xml of a managed package, and the dev name of components are not shown in package.xml. Table 8 illustrates a method for revealing a module namespace during retrieval. Of course, it should be noted that the method shown in Table 8 is set forth for illustrative purposes only, and thus should not be construed as limiting in any manner.

TABLE 8

```
Method 1 - Show modules as additional sub-directories:
    /retrieveUnpackaged
        /module1
            /objects
                customObjectsInModule1_c.object
                ...
        /module2
            /classes
                apexClassInModule2.cls-meta.xml
                apexClassInModule2.cls
            /objects
                legacyObject_c.object
                legacyObject2_c.object
            /classes
                legacyApexClass.cls
                legacyApexClass.cls-meta.xml
        ...
        package.xml
```

This may introduce an additional level of directories for modules while leaving old behavior the same. To handle situations where module names dash with component type names (since they are all directories at the same level), a mapping of modules to module directories may be specified in package.xml (or some other manifest file) or each module directory may be prefixed with something that will be disallowed in component type names.

Table 9 illustrates another method for revealing a module namespace during retrieval. Of course, it should be noted that the method shown in Table 9 is set forth for illustrative purposes only, and thus should not be construed as limiting in any manner.

TABLE 9

```
Method 2 - Put module directories inside a "modules" directory
    /retrieveUnpackaged
        /modules
            /module1
                /objects
                    customObjectsInModule1_c.object
                    ...
            /module2
                /classes
                    apexClassInModule.cls
                    apexClassInModule.cls-meta.xml
        /objects
            legacyObject_c.object
            legacyObject2_c.object
        /classes
            legacyApexClass.cls
            legacyApexClass.cls-meta.xml
        ...
        package.xml
```

This method may provide an extra level of indirection for the 16 modules directory. This may solve an issue where module names conflict with component type names.

Table 10 illustrates a method for modifying a package.xml to reflect all retrieved components. Of course, it should be noted that the method shown in Table 10 is set forth for illustrative purposes only, and thus should not be construed as limiting in any manner.

TABLE 10

Method 1 - Add components that belong to modules to the existing types node.
```
<?xml version="1.0" encoding="UTF-8"?>
<Package xmlns="http://soap.sforce.com/2006/04/metadata">
    <fullName>managedPackage</fullName>
    <apiAccessLevel>Unrestricted</apiAccessLevel>
    <namespacePrefix>appcde3</namespacePrefix>
    <types>
        <module name="module1">
            <members>customObjectsInModule1_c</members>
        </module>
        <module name="module2">
            <members>customObjectsInModule2_c</members>
        </module>
        <members>legacyObject_c</members>
        <name>CustomObject</name>
    </types>
    <types>
        <module name="module1">
            <members>ApexClassInModule1</members>
        </module>
        <members>ApexClassLegacy</members>
        <name>ApexClass</name>
    </types>
    <version>23.0</version>
</Package>
```

Table 11 illustrates another method for modifying a package.xml to reflect retrieved components. Of course, it should be noted that the method shown in Table 11 is set forth for illustrative purposes only, and thus should not be construed as limiting in any manner.

TABLE 11

Method 2 - Introduce a new file "module.xml" in each module subdirectory and leave package.xml unchanged. module.xml will contain all information about the module including its members.
```
<?xml version="1.0" encoding="UTF-8"?>
<Module xmlns="http://soap.sforce.com/2006/04/metadata">
    <name>module1</name>
    <namespacePrefix>appcde3</namespacePrefix>
    <types>
        <members>customObjectsInModule1_c</members>
        <name>CustomObject</name>
    </types>
    <types>
        <members>ApexClassInModule1</members>
        <name>ApexClass</name>
    </types>
</Module>
```

This approach may allow viewing all of the components in a particular module easily. It also leaves the existing package.xml unchanged which is nice if customers had custom parsing logic for the file. In addition, it may be easier to add more details about modules in a dedicated module.xml file.

Table 12 illustrates a hybrid method for modifying a package.xml to reflect all retrieved components. Of course, it should be noted that the method shown in Table 12 is set forth for illustrative purposes only, and thus should not be construed as limiting in any manner.

TABLE 12

Method 3 - A hybrid of the first two approaches.
```
<?xml version="1.0" encoding="UTF-8"?>
<Package xmlns="http://soap.sforce.com/2006/04/metadata">
    <fullName>managedPackage</fullName>
    <apiAccessLevel>Unrestricted</apiAccessLevel>
    <namespacePrefix>appcde3</namespacePrefix>
    <types>
        <members>legacyObject_c</members>
        <name>CustomObject</name>
    </types>
    <types>
        <members>ApexClassLegacy</members>
        <name>ApexClass</name>
    </types>
    <modules>
        <module>
            <name>module1</name>
            <types>
                <members>coInModule1_c</members>
                <name>CustomObject</name>
            </types>
            <types>
                <members>ApexClassInModule1</members>
                <name>ApexClass</name>
            </types>
        </module>
        <module>
            <name>module2</name>
            <types>
                <members>coInModule2_c</members>
                <name>CustomObject</name>
            </types>
        </module>
    </modules>
    <version>23.0</version>
</Package>
```

Deploy commands may include deployUnpackaged, deployCode, and other variants of 18 deployCode. The command deployUnpackaged may deploy unpackaged components, where deployCode deploys the entire contents of some package specified.

Additionally, in one embodiment, users may be allowed to move applications between environments. The change set infrastructure may be reused, and the module boundaries may be used to determine what metadata to move. This may allow for the moving of "deletes." In another embodiment, metadata will always be replaced in the target org.

Further, in one embodiment, users may be able to publish (e.g., upload) an application (and all modules it references), and an application may be installable into a different org in a similar way as a package. In another embodiment, a module may be internally mapped to a managed package. For, example, when a user installs an application, the required modules may be automatically installed. This may allow pushing at the module level. Versions may also be tracked at the module level, which would be required for an installed application that shares modules with another installed application.

System Overview

Figure 3:
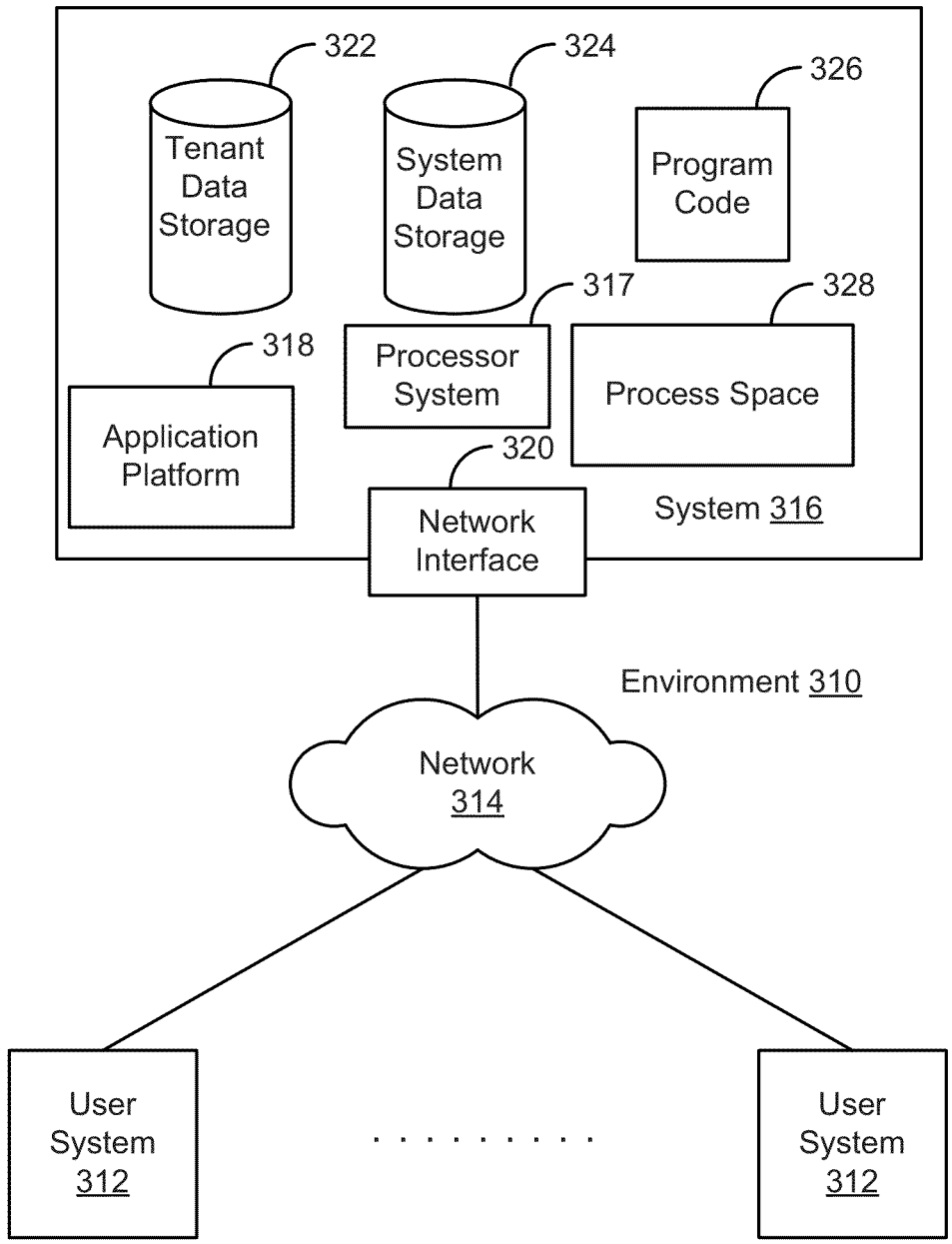
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, hut instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
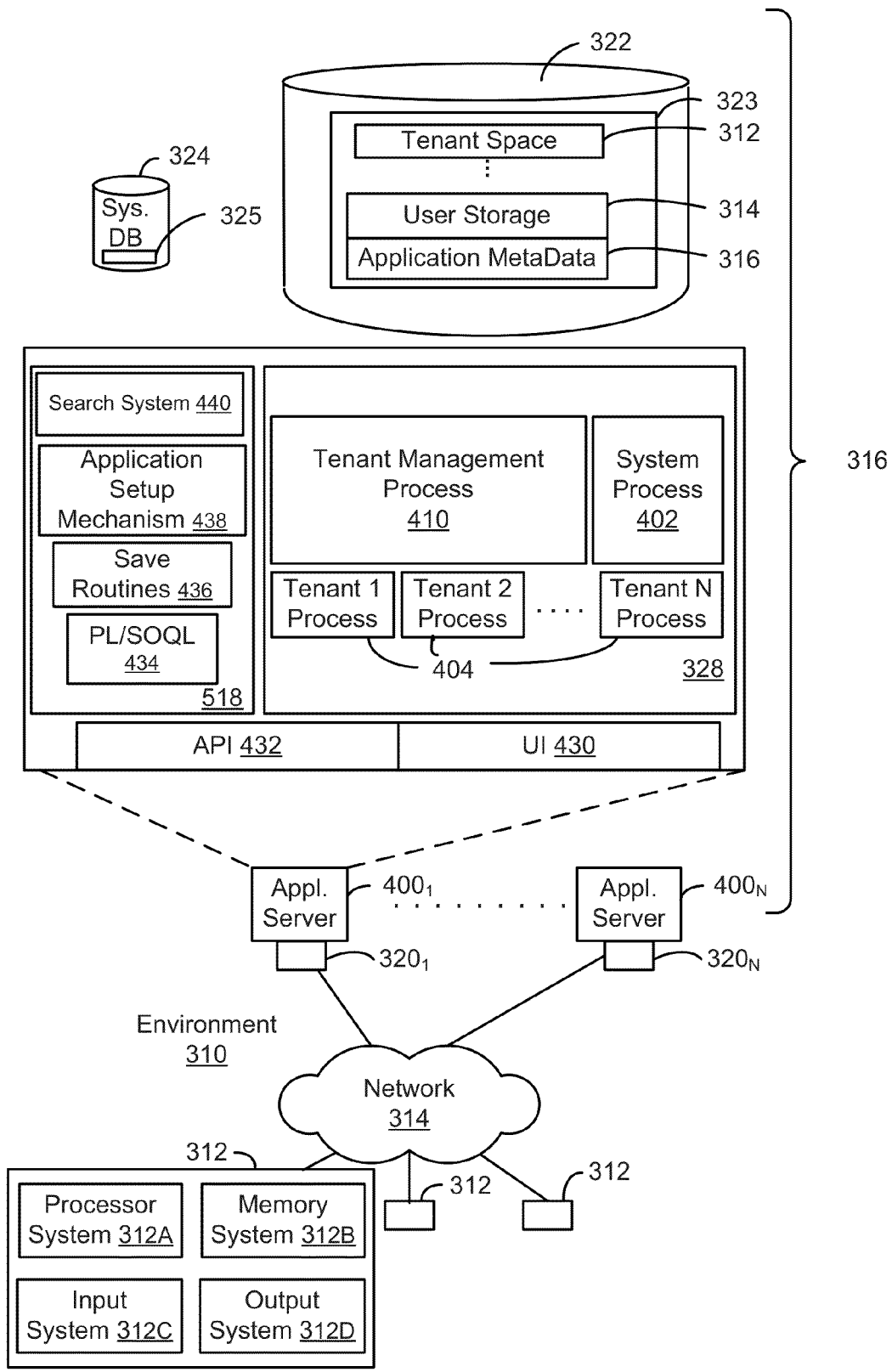
FIG. 4 illustrates a block diagram of an embodiment of elements of FIG. 5 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312 may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields, U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, the computer program product including computer code adapted to be executed by a computer to perform a method comprising:
   receiving, at a system, a request to create an application having one or more components;
   creating the application within the system, based on the request, the created application including a module having the one or more components of the application;
   defining, within the system, a unique namespace for the created application and dictating the unique namespace within the module;
   defining, within the system, a permission level for the unique namespace;
   limiting, through the system, access to components of the created application by applications outside of the unique namespace, in accordance with the permission level defined for the unique namespace;
   preventing, through the system, access by the components of the created application to metadata outside of the unique namespace when the permission level defined for the unique namespace dictates that the access by the components of the created application to the metadata outside of the unique namespace is disallowed;
   wherein the system implements a module directory to distinguish between an application component type within the system and an application module within the system having a same name.

2. The computer program product of claim 1, wherein the system includes a multi-tenant on-demand database system.

3. The computer program product of claim 1, wherein the request is received from a user associated with an organization registered within the system.

4. The computer program product of claim 1, wherein the request includes code used for creating the application.

5. The computer program product of claim 1, wherein the request is created utilizing an interface of the system.

6. The computer program product of claim 1, wherein the application includes a standalone application.

7. The computer program product of claim 1, wherein the application is created within and associated with an organization of the system and is isolated from all other applications within the system, such that data accessed by the application cannot be accessed by any other applications within the system.

8. The computer program product of claim 1, wherein the application includes a manifest that includes one or more details of the application, including an identifier of the application.

9. The computer program product of claim 1, wherein the module includes a container containing metadata, where such metadata is named, organized, and called utilizing the unique namespace for the application.

10. The computer program product of claim 9, wherein the metadata includes configuration information that dictates how the application is used.

11. The computer program product of claim 9, wherein the metadata includes one or more schemas or programmatic elements associated with the application.

12. The computer program product of claim 1, wherein the permission level includes one of: allowing the components of the created application to be accessed by the applications outside of the unique namespace, disallowing the components of the created application to be accessed by the applications outside of the unique namespace.

13. A method, comprising:
   receiving, at a system, a request to create an application having one or more components;
   creating the application within the system, based on the request, the created application including a module having the one or more components of the application;
   defining, within the system, a unique namespace for the created application and dictating the unique namespace within the module;
   defining, within the system, a permission level for the unique namespace;
   limiting, through the system, access to components of the created application by applications outside of the unique namespace, in accordance with the permission level defined for the unique namespace;
   preventing, through the system, access by the components of the created application to metadata outside of the unique namespace when the permission level defined for the unique namespace dictates that the access by the components of the created application to the metadata outside of the unique namespace is disallowed;
   wherein the system implements a module directory to distinguish between an application component type within the system and an application module within the system having a same name.

14. An apparatus, comprising:
   a processor of a system for:
      receiving, at the system, a request to create an application having one or more components;
      creating the application within the system, based on the request, the created application including a module having the one or more components of the application;
      defining, within the system, a unique namespace for the created application and dictating the unique namespace within the module;
      defining, within the system, a permission level for the unique namespace;
      limiting, through the system, access to components of the created application by applications outside of the unique namespace, in accordance with the permission level defined for the unique namespace;
      preventing, through the system, access by the components of the created application to metadata outside of the unique namespace when the permission level defined for the unique namespace dictates that the access by the components of the created application to the metadata outside of the unique namespace is disallowed;
      wherein the system implements a module directory to distinguish between an application component type within the system and an application module within the system having a same name.

* * * * *